United States Patent [19]

Baria et al.

[11] Patent Number: 5,031,719
[45] Date of Patent: Jul. 16, 1991

[54] SEISMIC SONDE

[75] Inventors: Roy Baria; Nigel P. J. Halladay; Robert Gillatt, all of Truro, United Kingdom

[73] Assignee: The Secretary of State for Energy in Her Britannic Majesty's Government of the United Kingdom of Great Britain and Northern Ireland, London, England

[21] Appl. No.: 350,972

[22] Filed: May 12, 1989

[30] Foreign Application Priority Data

Mar. 23, 1989 [GB] United Kingdom ................. 8906752

[51] Int. Cl.$^5$ ............................................. G01V 1/40
[52] U.S. Cl. .................................... 181/122; 181/102; 367/911; 367/912
[58] Field of Search ................................. 181/102–106; 367/25, 81, 911, 912; 340/853, 857, 859, 853.8, 856.2

[56] References Cited

U.S. PATENT DOCUMENTS

| 3,777,814 | 12/1973 | Gustavson et al. | 367/912 X |
| 3,876,971 | 4/1975 | Wuenschel | 181/106 |
| 4,686,653 | 8/1987 | Staron et al. | 367/25 |
| 4,744,438 | 5/1988 | Ruzie et al. | 367/911 |
| 4,789,968 | 12/1988 | Rice | 181/104 |
| 4,899,844 | 2/1990 | Katahara et al. | 367/911 |
| 4,901,289 | 2/1990 | Cretin et al. | 340/858 |
| 4,932,003 | 6/1990 | Winbow et al. | 367/25 X |

FOREIGN PATENT DOCUMENTS 2564599 11/1985 France .

Primary Examiner—Brian S. Steinberger
Attorney, Agent, or Firm—William R. Hinds

[57] ABSTRACT

An instrument for sensing seismic waves and determining their direction of propagation is operable at considerable depth in a borehole. It comprises a short, stubby sensor module with means to clamp it to the borehole wall and including three accelerometers, and connected by a flexible umbilical cord to a primary module suspended by a cable. The down-hole electronics and the power supply for the clamp means are provided in the primary module. The sensor module has a fundamental resonant frequency about 1 kHz, well above the frequency of the seismic waves it is subjected to, so that the signals from the accelerometers accurately represent those waves.

6 Claims, 3 Drawing Sheets

SEISMIC SONDE

The invention relates to an instrument for sensing seismic waves, and in particular to such an instrument suitable for use within a borehole.

In the development of a hot dry rock geothermal energy system it is proposed to open up a network of cracks within a mass of rock at considerable depth below the earth's surface by injecting a suitable fluid. This enables portions of the rock to move relative to each other, owing to geological stresses, so that fluid flow paths extend through the rock. Each such movement generates seismic waves of small amplitude. To monitor the development of the crack network it is necessary to determine the location of each such microseismic event. If the events are near the surface they can be located using seismic sensors such as geophones at different positions at or just below the surface and comparing the arrival times of microseismic waves at the various sensor positions. However such a location technique may not be possible if the events are at a depth of several kilometers, as the amplitude of the microseismic waves at the surface may then be too small.

According to the present invention there is provided an instrument for sensing seismic waves, the instrument being operable within a borehole and comprising a sensor module insertable into the borehole, the sensor module incorporating a clamp mechanism whereby it may be clamped to the wall of the borehole, and incorporating three accelerometers respectively arranged to sense seismic wave components propagating in three mutually perpendicular directions and to provide signals representing said components, and means for sensing the orientation of the sensor module and for providing signals representing the orienation, the sensor module being of such dimensions as to have a fundamental resonant frequency well above 1 kHz, and a primary module insertable into the borehole, connected to the sensor module by a flexible cable and incorporating a power supply for the clamp and electronic means responsive to the signals representing the said components and the orientation.

Preferably the sensor module is sufficiently short and sufficiently rigid to have a fundamental resonant frequency above 1.5 kHz, desirably about 2.0 kHz. Preferably the clamp is a hydraulic clamp, the power supply in the primary module being a hydraulic pump and the cable including a flexible hydraulic duct. The orientation sensor desirably comprises an inclinometer and a compass.

Arranging the instrument as two separate modules, the sensor module containing only the clamp mechanism and the various sensors, while the associated power supply and electronics are in the primary module, enables the sensor module to be made comparatively short (its diameter being limited by the requirement to fit inside a borehole), and so to have a comparatively high fundamental resonant frequency. Consequently the response of the accelerometers to seismic waves of different frequencies is substantially uniform for all frequencies up to 1 kHz, which is above the frequencies typical of the waves from the microseismic events. The accelerometers therefore provide signals which accurately correspond to the components of the seismic waves, and so enable the direction of propagation of the waves to be determined. The distance between the instrument and the seismic event from which the waves originate can be readily determined by measuring the time interval between the receipt of compression waves and shear waves from the same seismic event.

The invention will now be further and more particularly described, by way of example only, and with reference to the accompanying drawings in which.

Figure 1:
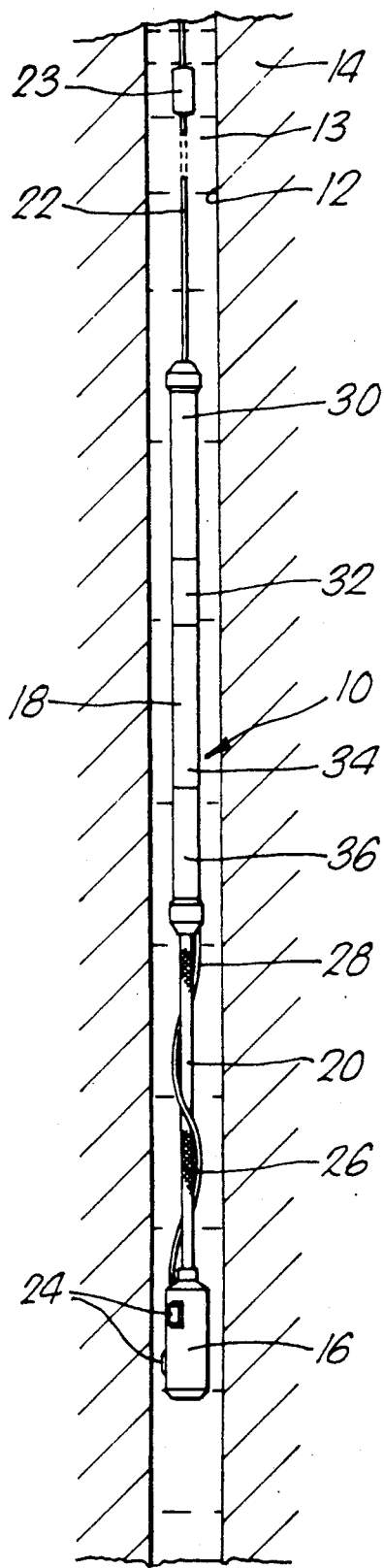
FIG. 1 shows a seismic instrument within a borehole, the instrument comprising a sensor module and a primary module.

Referring to FIG. 1 a seismic instrument 10 for sensing seismic waves is shown within a borehole 12 filled with fluid 13 (typically water) and extending through rock 14. The instrument 10 comprises a cylindrical sensor module 16 connected to a cylindrical mother or primary module 18 by a flexible umbilical cord 20, the primary module 18 being supported by a seven-core armoured cable 22 five kilometers long which extends to a cable drum at a surface station (not shown) at the top of the borehole 12. As described later in relation to FIG. 4 at least one hydrophone and cable head unit 23 is installed in the cable 22 above the module 18. The instrument 10 might be for example three or four kilometers below the earth's surface, and because the borehole 12 is filled with fluid 13 the instrument 10 is exposed to considerable hydrostatic pressure.

The sensor module 16 is of Monel (non-magnetic copper-nickel alloy) with an external diameter of 178 mm and an overall length of 560 mm. As described in greater detail later it incorporates a hydraulic ram (not shown in FIG. 1) whereby it can be clamped firmly to the side of the borehole 12, and also has three protruding feet 24 (only two are shown); furthermore it includes electronic instruments (not shown in FIG. 1). The umbilical cord 20 consists of two components: firstly an oil-filled polytetrafluorethylene tube 26 covered by stainless steel braiding for protection and within which are a stainless steel rope to support the load on the cord 20, and wires to provide electrical contact to the instruments in the sensor module 16, and secondly a hydraulic pipe 28 wound around the tube 26, which provides fluid to the hydraulic ram in the sensor module 16. The primary module 18 is of stainless steel, of external diameter 110 mm and of overall length about 2.5 m. It consists of four portions joined end to end: a top portion 30 to which the cable 22 is connected, and which contains electronics; a portion 32 containing an electric motor; a portion 34 containing a hydraulic cylinder; and a lower termination portion 36 to which the umbilical cord 20 is connected.

Figure 2:
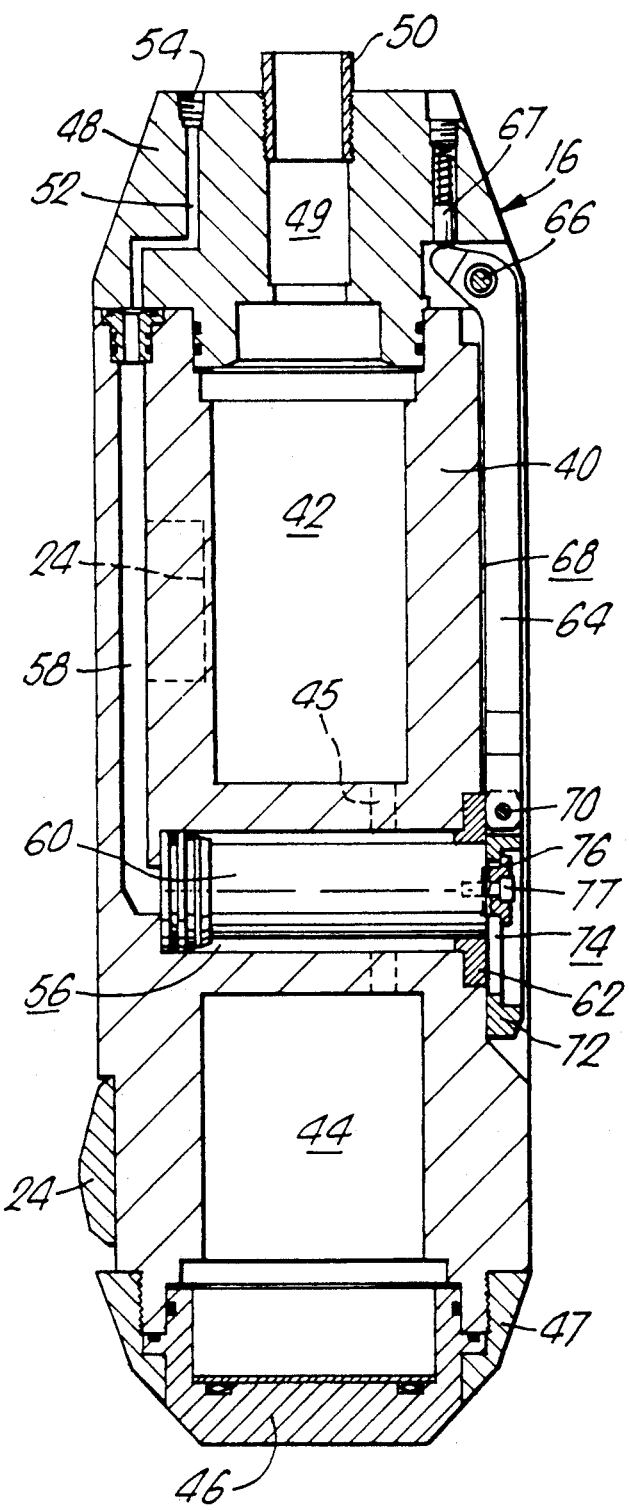
FIG. 2 shows to a larger scale and in sectional view the sensor module of FIG. 1.

Referring now to FIG. 2 the sensor module 16 comprises a central barrel 40 defining a top cylindrical cavity 42 and a bottom cylindrical cavity 44 connected by a duct 45. The cavities 42 and 44 are respectively of diameters 80 and 90 mm, and accommodate electronic instruments (not shown): the bottom cavity 44 locates two inclinometers set at right angles and a digital compass, while the top cavity 42 locates three accelerometers arranged to respond to accelerations in three perpendicular directions. An electronic thermometer is also located in the top cavity 42. The bottom cavity 44 is closed by a sealing cap 46 held onto the barrel 40 by a screw-threaded retaining ring 47. The top cavity 42 is closed by a bolted-on top cap 48 with an axial duct 49 in which is fixed an end clamp 50 for the braided tube 26 (see FIG. 1); the cap 48 also defines a hydraulic fluid duct 52 and a socket 54 into which the hydraulic pipe 28 is plugged. The wires in the tube 26 of the umbilical 20 terminate at a connector plug (not shown) which plugs into a corresponding socket (not shown) in the duct 49, to provide electrical contact to the instruments.

Between the two cavities 42 and 44 the barrel 40 is solid, but defines a transverse cylindrical hole 56 open to the right hand side (as shown) of the module 16. A duct 58 extends through the thick side wall of the barrel 40 between the duct 52 in the top cap 48 and the closed end of the hole 56, to provide hydraulic fluid to the hole 56. A piston 60 is slidable along the hole 56, passing through an annular guide ring 62 fixed into the open end of the hole 56. A drag link 64 is connected by a pivot pin 66 to the top cap 48, with an end portion abutting a spring-loaded thrust pin 67, and lies (as shown) in a recess 68 along the right hand side of the module 16; the lower end of the drag link 64 is connected by a pivot pin 70 to a clamp foot 72. The clamp foot 72 defines a rectangular slot 74 with rounded ends, and a retaining cap 76 locates in the slot 74, being slidable along it, and being fixed by a screw 77 to the end of the piston 60. As previously mentioned the module 16 is provided with three protruding feet 24, one of which lies in the plane of the Figure, below the level of the piston 60, and the other two (indicated by a broken line) are at 60° to this plane, above the level of the piston 60.

Figure 3:
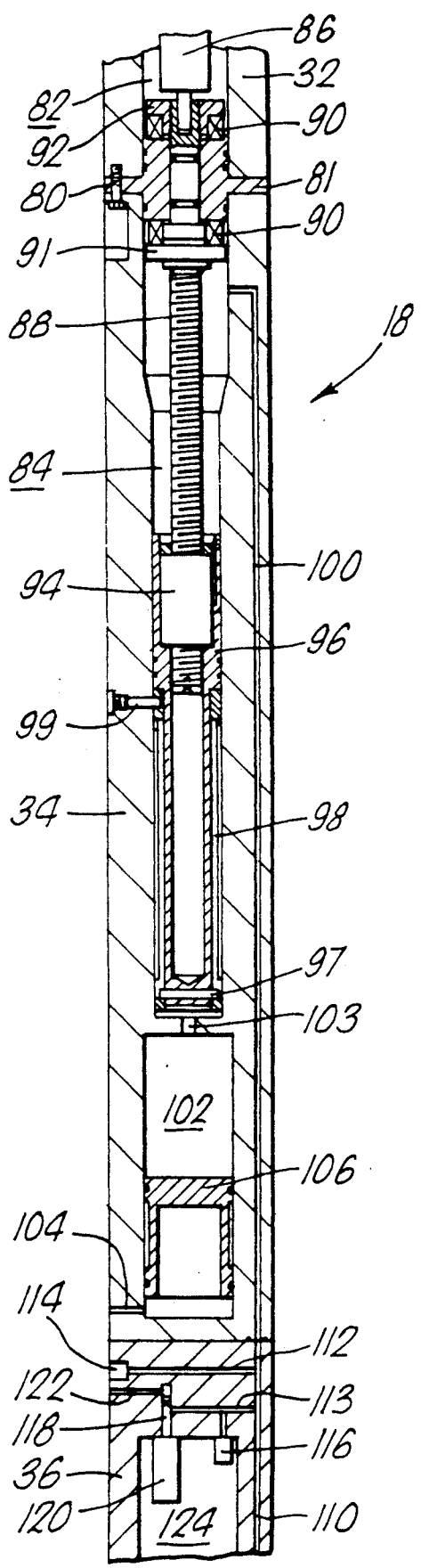
FIG. 3 shows to a larger scale and in sectional view part of the primary module of FIG. 1.

Referring now to FIG. 3 there is shown a sectional view of part of the primary module 18, showing part of the electric motor portion 32, the hydraulic portion 34, and part of the lower termination portion 36, all of which are of stainless steel and of external diameter 110 mm and fixed end to end to each other by bolts 80 (only one of which is shown). Between the motor portion 32 and the hydraulic portion 34 is sandwiched a motor union 81 defining an axial passageway and two opposed locating stubs which locate in axial cylindrical chambers 82 and 84 in the two portions 32 and 34. An electric motor 86 is mounted within the chamber 82 with its shaft pinned to a drive shaft 88 which extends through the passageway through the motor union 81 and is sealed to it by O-rings. Thrust races 90 are provided on each side of the motor union 81, bearing against a flange 91 on the shaft 88 just below the union 81, and a backnut 92 threaded to the shaft 88 just above the union 81, respectively. The drive shaft 88 extends about 270 mm below the flange 91, just over half the length of the chamber 84, and is threaded along this portion of its length.

The threaded part of the shaft 88 engages in a ball nut 94 keyed to and fixed in a long tubular piston 96, the piston 96 being sealed by O-rings to the wall of the chamber 84. A stop pin 97 extends transversely through the bottom end of the piston 96 and engages at each end in slots in a stop sleeve 98; the sleeve 98 is fixed by a pin 99 to the wall of the chamber 84, and the slots are only as long as the desired stroke, and so the piston 96 is prevented from rotating or indeed exceeding the desired stroke. A duct 100 for hydraulic fluid communicates with the chamber 84 near the top end, and extends to the lower end of the hydraulic module 34. A second chamber 102 is also defined within the hydraulic module 34, communicating at its upper end via a port 103 with the lower end of the chamber 84, and at its lower end via a duct 104 with the surrounding borehole fluid, and contains a free piston 106. The portion of the chamber 102 above the piston 106 is filled with hydraulic fluid, and the entire chamber 84 both above and below the piston 96 is also filled with hydraulic fluid.

The duct 100 communicates with a duct 110 extending the length of the lower termination portion 36 to a socket (not shown) for the top end of the hydraulic pipe 28 (see FIG. 1). Two branch ducts 112 and 113 communicate with the duct 110. The first branch duct 112 communicates with a bursting disc assembly 114, and the second branch duct 113 communicates with a pressure transducer 116, and also with a spool valve 118 operable by a solenoid 120, the valve 118 preventing communication with a leakage duct 122 open to the borehole 12 unless the valve 118 is opened by activating the solenoid 120. The transducer 116 and the solenoid 120 are mounted in a chamber 124 within the termination portion 36.

A duct (not shown) for electrical wires extends within the walls of the motor portion 32, and the hydraulic portion 34, communicating at its ends with a chamber in the top portion 30 (see FIG. 1) and with the chamber 124 in the portion 36. At the lower end of the chamber 124 (not shown) is a connector socket at which wires terminate, and into which plugs a connector plug at the top end of the braided tube 26 of the umbilical 20.

In operation, the instrument 10 is lowered by means of the cable 22 to a desired depth in the borehole 12. The electric motor 86 is then energised, and pulls the piston 96 towards the top of the chamber 84. There is substantially no pressure difference between the top and bottom of the free piston 106 so that the pressure below the piston 96 is that of the borehole fluid 13. Pressurised hydraulic fluid flows along the ducts 100 and 110, through the hydraulic pipe 28, and along the ducts 52 and 58 to the hole 56, pushing the piston 60 out until the clamp foot 72 hits the wall of the borehole 12. When the sensor module 16 is firmly clamped to the rock 14, the clamp foot 72 and the three feet 24 all engaging the wall, the motor 86 is de-energised. The primary module 18 is lowered another meter or so to ensure the umbilical cord 20 is slack, and seismic observations are then made, as described in more detail below.

When observations are completed the above procedure can be reversed, the motor 86 being energised the other way to return the hydraulic fluid to the chamber 84 and so withdraw the piston 60 and the clamp foot 72. If for some reason the piston 60 were to become jammed and not withdraw, the sensor module 16 could nevertheless be raised up using brute force; this does not tend to bend the piston 60 because the borehole wall contacts only the clamp foot 72, which is supported axially by the drag link 64. Indeed dragging the sensor module 16 up the borehole 12 tends to force the piston 60 into the hole 56; this increases the pressure of the hydraulic fluid, and may cause it to exceed the burst pressure of the bursting disc 114 so that hydraulic fluid is released into the borehole 12. In emergency if it is necessary to reduce the pressure of the hydraulic fluid, for example, if the motor 86 were to seize up, the solenoid 120 may be energised to open the spool valve 118 and so to dump the hydraulic fluid into the borehole 12.

Figure 4:
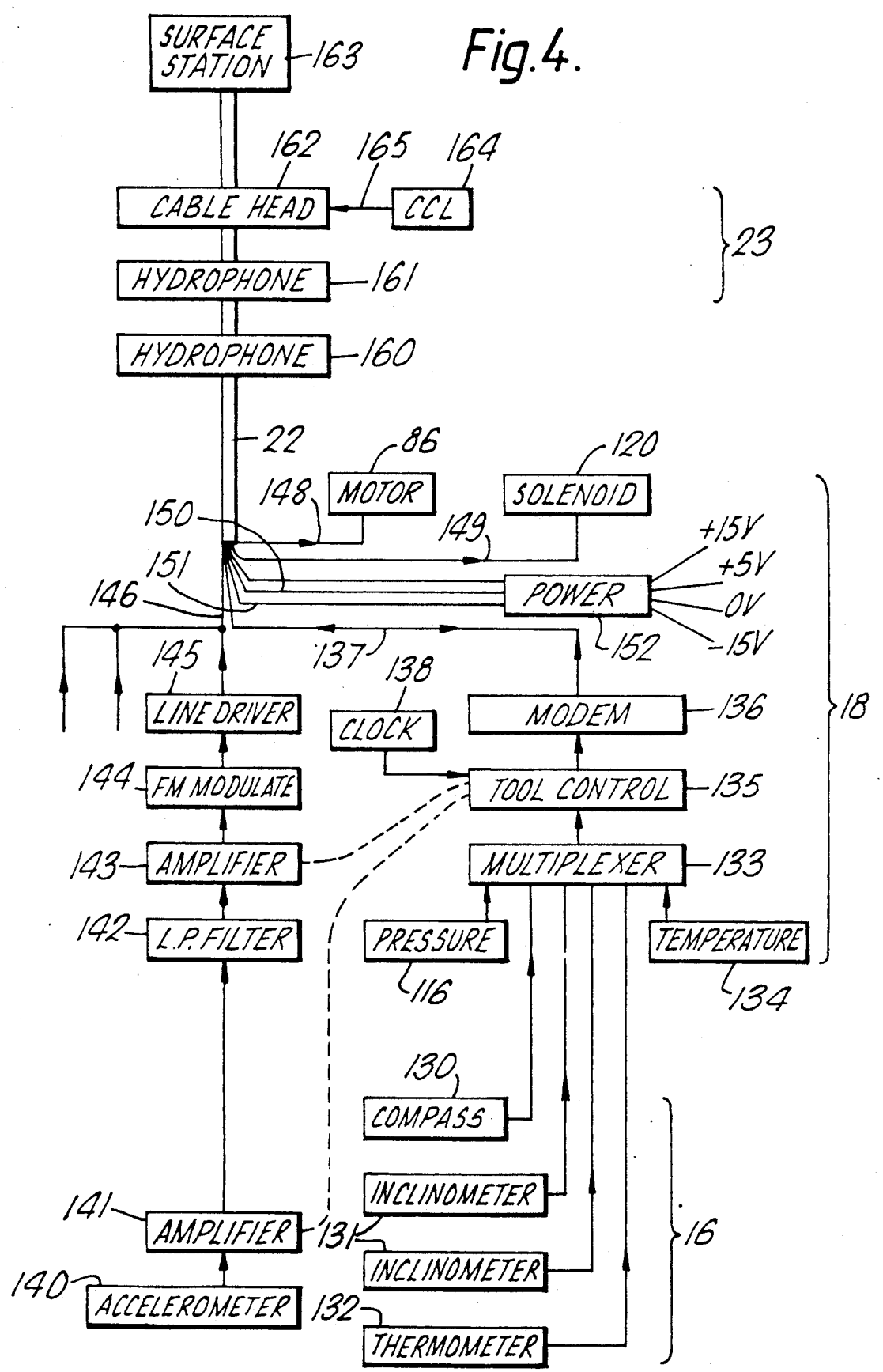
FIG. 4 shows diagrammatically the electronics of the instrument of FIG. 1.

Referring to FIG. 4 the electronics of the instrument 10 is shown diagrammatically. The sensor module 16 contains an electronic compass 130, two electronic inclinometers 131, and an electronic thermometer 132; these instruments are connected to a multiplexer 133 in the primary module 18, which also receives signals from an electronic thermometer 134, from the pressure sensor 116, and from sensors measuring any other parameters which it is desired to monitor such as the tension in the umbilical cord 20, or the operation of the electrical power supply. Signals from the multiplexer 133 are sent via a tool control unit 135 to a modem 136 and so to a modem line 137.

The sensor module 16 also contains three accelerometers 140 each with an associated amplifier 141 (only one is shown); the signals from the amplifier 141 are received by a low-pass filter 142 in the primary module 18, then amplified by an amplifier 143 and used by a modulator unit 144 to modulate a carrier signal from an oscillator; the modulated signal is amplified to 0.5 V(rms) by a line driver 145, and sent out on a telemetry line 146. The line 146 carries signals from all three accelerometers 140 but the carrier frequencies are different: for example 32, 64 and 96 kHz.

The modem line 137 carries signals in both directions, enabling an operator to send control signals to the tool control unit 135, which can for example adjust the gain of the amplifiers 141 and 143 (as indicated by broken lines). The transmission of data signals by the modem 136 may be under the control of a clock unit 138, for example to send signals every minute. The cable 22 also incorporates power supply lines for the instrument 10: a supply line 148 for the motor 86, a supply line 149 for the solenoid 120, and two supply lines 150 and 151 at + and −24 V which are connected to a power supply unit 152 in the primary module 18. The armour of the cable 22 provides an earth contact. The power supply unit 152 provides outputs at 0, +5, +15 and −15 V suitable for powering the several electronic components.

About 100 m above the primary module 18 the cable 22 connects to a first hydrophone 160, and 100 m further the cable 22 connects to a second hydrophone 161. The cable 22 then connects to a cable head unit 162, and then goes up the borehole (e.g. 4 km) to the surface station 163. Each hydrophone 160 and 161 takes its power supply from the supply leads 150 and 151 in the cable 22; it can be addressed (e.g. for gain control) via the modem line 137 in the cable 22; and transmits sensed acoustic signals on the telemetry line 146 in the cable 22, at different carrier frequencies to those carrying the signals from the accelerometer 140, for example, at 128 and 160 kHz. The cable head unit 162 is preferably integral with the hydrophone 161, as unit 23; in it the signals on the telemetry line 146 are amplified about ten times for transmission to the surface station 163, and the voltages of the power lines 150 and 151 are stabilised at + and −24 V, having been received at about 30 V. The unit 23 also includes a magnetic sensor 164 whose signals are transmitted to the surface station 163 along line 165 within the cable 22, the signals indicating the locations of casing collars in any portion of the borehole 12 which is cased, and so indicating the depth of the instrument 10.

The sensor module 16 of the instrument 10 described above has a fundamental resonant frequency (for longitudinal bending) of about 1.8 kHz which is well above the range of frequencies of the seismic waves in the rock 14. Consequently the signals from the accelerometers 140 accurately represent the magnitudes of the components of the seismic waves and so enable the direction from which the waves are coming to be determined. The hydrophones 160 and 161 together provide an alternative way of locating the seismic source, and so provide a check on the operation of the accelerometers 140. One or both hydrophones 160 and 161 can be dispensed with, and in the latter case the cable head unit 162 can be incorporated within the primary module 18. Although the sensor module 16 is decribed as containing three accelerometers 140 it may also incorporate an additional one. This can improve the ability to locate microseismic events, providing some redundancy in the data, and enabling the error in the location to be estimated. The sensor module 16 is suitable for use in boreholes 12 of diameter between about 190 mm and 280 mm (e.g. 210 mm). For operation in boreholes of smaller diameter, down to about 120 mm, a sensor module 16 of smaller diameter would be used but with the same cord 20 and primary module 18.

We claim:

1. An instrument for sensing seismic waves, the instrument being operable within a borehole and comprising a sensor module insertable into the borehole, the sensor module incorporating a clamp mechanism whereby it may be clamped to the wall of the borehole, and incorporating three accelerometers respectively arranged to sense seismic wave components propagating in three mutually perpendicular directions and to provide signals representing said components, and means for sensing the orientation of the sensor module and for providing signals representing the oriention, the sensor module being of such dimensions as to have a fundamental resonant frequency above 1 kHz, and a primary module insertable into the borehole, connected to the sensor module by a flexible cable and incorporating a power supply for the clamp and electronic means responsive to the signals representing the said components and the orientation.

2. An instrument as claimed in claim 1 wherein the sensor module has a fundamental resonant frequency above 1.5 kHz.

3. An instrument as claimed in claim 1 wherein the clamp mechanism is a single hydraulic clamp, the flexible cable includes a flexible hydraulic duct, and the primary module incorporates an electronically-operated hydraulic pump, the clamp comprising a piston and a clamp foot, the clamp foot being displaceable by the piston outwardly from the sensor module to contact the wall of the borehole, the outward displacements of the piston and of the clamp foot being equal.

4. An instrument as claimed in claim 1 wherein there is provided a cable for supporting the primary module within the borehole, and at least one hydrophone supported by the cable within the borehole but above the primary module.

5. An instrument as claimed in claim 4 wherein two hydrophones are supported by the cable within the borehole but above the primary module and spaced from each other along the cable.

6. An instrument for sensing seismic waves, the instrument being operable within a borehole and comprising a sensor module insertable into the borehole, the sensor module incorporating a clamp mechanism whereby it may be clamped to the wall of the borehole, and incorporating three accelerometers respectively arranged to sense seismic wave components propagating in three mutually perpendicular directions and to provide signals representing said components, and means for sensing the orientation of the sensor module and for providing signals representing the orientation, the sensor module being of such dimensions as to have a fundamental resonant frequency above 1 kHz, and a primary module insertable into the borehole, connected to the sensor module by a flexible cable and incorporating a power supply for the clamp and electronic means responsive to the signals representing the said components and the orientation, said electronic means comprising three oscillators of different frequencies, modulating means whereby the signals representing the said wave components are used to modulate the three different frequencies, and means to transmit the three modulated frequencies along a common telemetry line to a surface station.

* * * * *